MANIFOLD HOUSING AND TELEPHONE SUPPORT

Filed Dec. 7, 1953 2 Sheets-Sheet 1

INVENTORS
KARL DOMBERGER
SOL RAEL
BY
William R. Liberman
ATTORNEY

MANIFOLD HOUSING AND TELEPHONE SUPPORT

Filed Dec. 7, 1953 2 Sheets-Sheet 2

INVENTORS
KARL DOMBERGER
SOL RAEL
BY
William R. Liberman
ATTORNEY

United States Patent Office 2,731,763

Patented Jan. 24, 1956

2,731,763

MANIFOLD HOUSING AND TELEPHONE SUPPORT

Karl Domberger, Maspeth, and Sol Rael, Jackson Heights, N. Y.

Application December 7, 1953, Serial No. 396,631

3 Claims. (Cl. 45—.5)

The present invention relates to an improved manifold housing and it relates more particularly to an improved combination manifold housing and telephone support.

It is highly convenient and it is the general practice to have available in the immediate vicinity of a telephone, a note pad and a directory of the names, addresses and telephone numbers most frequently required. However, particularly domestically, the space available for a personal directory and note pad in addition to a telephone is small resulting in a cluttered and crowded appearance which is both unsightly and unattractive. Furthermore, there is a tendency for the directory and the note pad to be removed from the neighborhood of the telephone making them unavailable when required.

It is therefore a principal object of the present invention to provide an improved manifold housing.

Another object of the present invention is to provide an improved combination manifold housing and telephone support.

Still another object of the present invention is to provide an improved manifold housing which serves as a platform for a telephone and requires little or no increased space.

A further object of the present invention is to provide an improved combination manifold housing and telephone support in which the manifold is normally retained in the housing and is made immediately available by a simple manipulation.

Still a further object of the present invention is to provide an improved combination manifold housing and telephone support which is of simple, inexpensive and rugged construction and is of neat and attractive appearance.

Another object of the present invention is to provide an improved manifold housing and telephone support in which the manifold is normally located in the housing and may be readied for immediate use by a simple triggering action.

The above and further object of the prseent invention will become apparent from a reading of the following description taken in conjunction with the accompanying drawings wherein, Figure 1 is a perspective view of a preferred embodiment of the present invention illustrating the manifold in housed condition and supporting a conventional telephone which is shown in broken line;

Figures 1, 2:
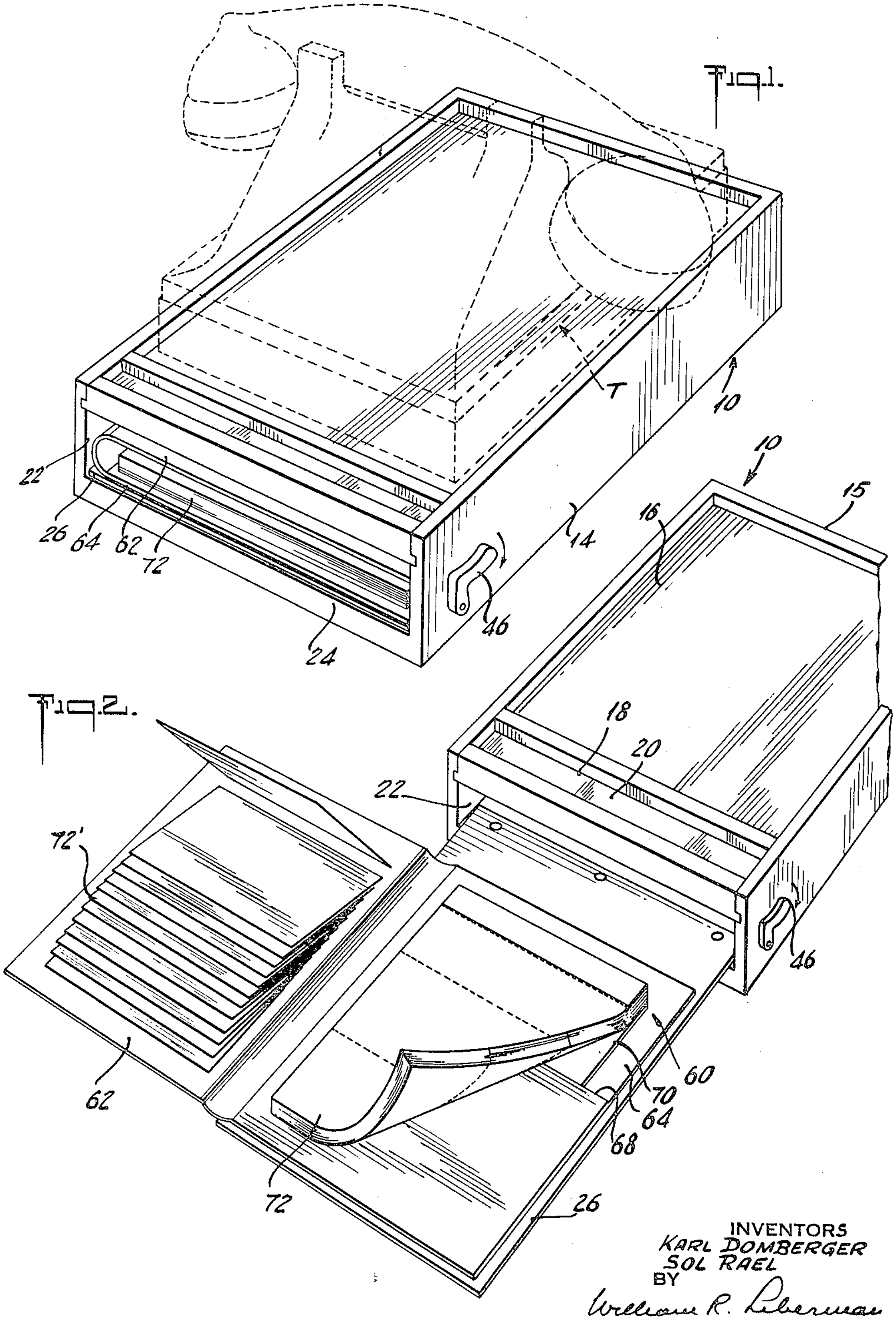
Figure 2 is a perspective view of the improved device, partially broken away for convenience of illustration, showing the manifold in extended position ready for use.

The present invention broadly contemplates the provision of a device of the character above set forth comprising a housing having a front opening formed therein, a manifold support slideably mounted for movement through said opening between a housed position substantially within said housing and an extended position substantially external to said housing, spring means urging said support to an extended position and latching means for releasably retaining said supoprt in the housed position.

In accordance with a preferred embodiment of the present invention the housing is of substantially flat rectangular configuration having a top wall whose upper face defines a telephone locating and supporting platform, a bottom wall and a front opening therethrough extending the width of the housing. A transverse bar or ledge projects upwardly along the forward edge of the bottom for the full length of the front opening. The manifold support consists of a rectangular plate having a pair of laterally spaced skids depending from the rear portion thereof the skids having forwardly directed bottom legs and a pair of latching detents having inclined trailing surfaces depending from the forward portion thereof. In housed position the forward portion of the manifold support rests on the ledge with the leading face of the latching detents abutting the rear wall of the ledge. A transversely extending crank member is rotatably supported below the level of the manifold support by the forward part of the housing side walls and includes a lower and transversely extending bar and a forward transversely extending ecentric bar the latter defining an unlatching lift, and terminating in a manipulating finger external to the housing. A long helical tension spring has one end secured to the rear portion of the housing wall, extends forwardly around the crank's lower eccentric bar and then rearwardly to engage the back portion of the manifold support. The helical spring thus serves the dual purpose of urging the manifold support to its extended position and rotating the crank so that the lift member is in its lowermost inactive position. Thus the momentary raising of the lift member by way of the crank finger piece unlatches the manifold support which is carried to its extended position by the helical spring. A pair of laterally spaced recesses in longitudinal alignment with the skids are formed in the back face of the ledge and have inclined upper surfaces to permit the manifold support to rotate to a predetermined inclined position when extended. The manifold support may carry a pad, a directory or any other desirable articles.

Reference is now made to the drawings which illustrate a preferred embodiment of the present invention wherein the numeral 10 generally designates a housing including a bottom wall 12, side walls 14, 14, a rear wall 15 and a top wall 16. The top wall 16 is secured to the side walls 14 and to the rear wall below the top thereof by virtue of its side and rear edges engaging a corresponding groove formed in the inner upper face of the rear and side walls. The upper face of the top wall 16 defines a telephone receiving and locating platform, and is provided along its front border with a laterally extending raised portion 18 having a longitudinal recess 20 formed therein to provide a suitable receptacle for writing implements. The front end of the housing 10 is open as at 22, a raised portion or ledge 24 being formed along the forward edge of the bottom wall 12 extending across the full width of the opening 22.

A manifold support plate 26 of rectangular configuration is normally disposed within the housing 10 and is slideable through the opening 22 to an extended or advanced position substantially external to the housing 10 as illustrated in Figures 2 of the drawings. Depending from the rear edge of the support plate 26 are a pair of laterally spaced skids 28 having forwardly directed horizontal lower legs 30 which ride along the upper surface of the housing bottom wall 12. The inner face of the ledge 24 is undercut to form a pair of correspondingly spaced recesses 32 having rearwardly upwardly inclined upper faces 33 and adapted to receive the legs 30 when the support plate 26 is in its extended position. It should be noted that when the support plate 26 is in its fully extended or advanced position it is downwardly inclined at a predetermined angle by virtue of the upper surface of of the skid legs 30 engaging the recess surfaces 33.

Figures 3, 4, 5, 6, 7:
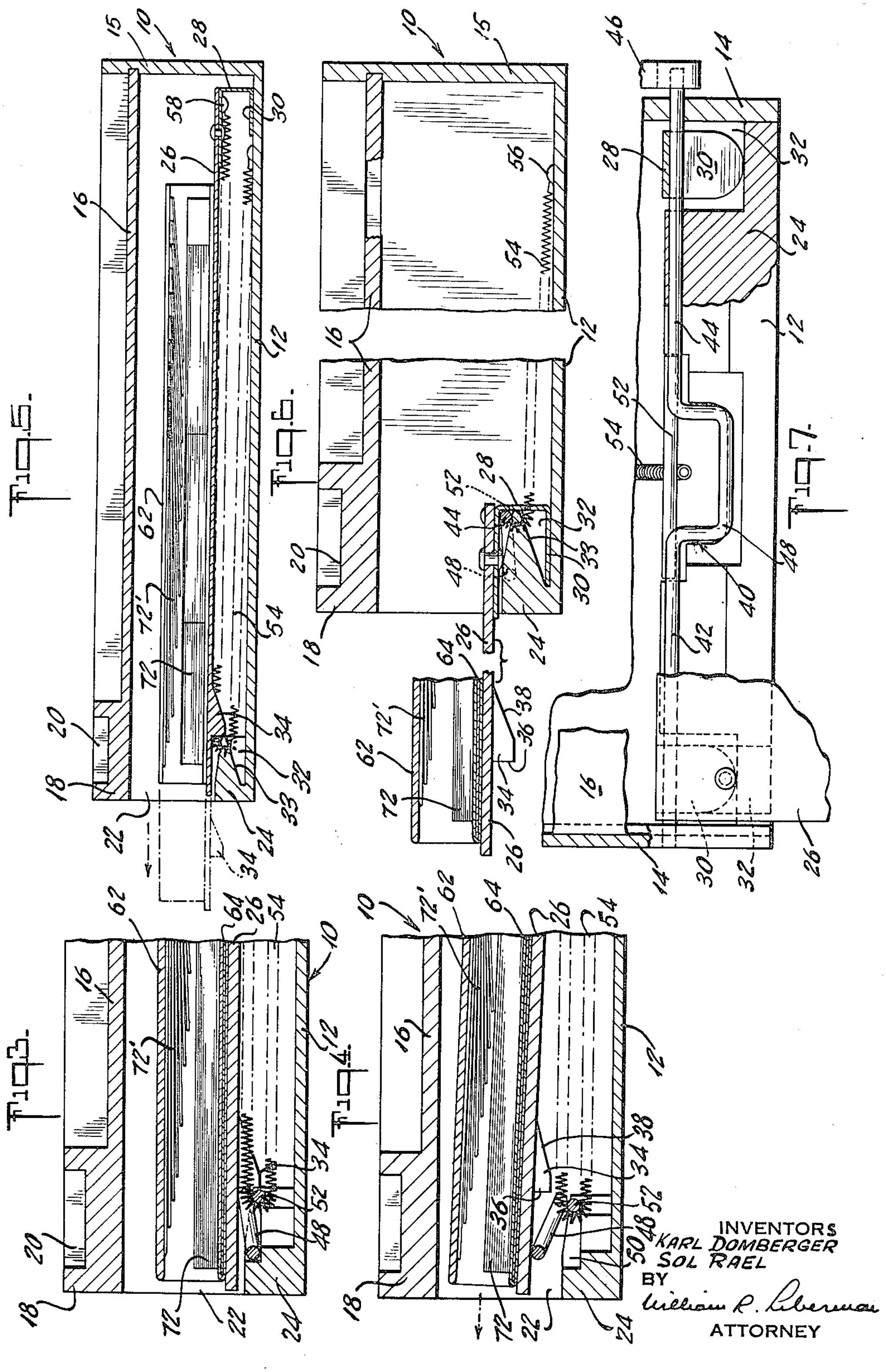
Figure 3 is a central longitudinal sectional detail view of the forward portion of the present embodiment showing the manifold support in housed latched position.
Figure 4 is a central longitudinal sectional detail view of the forward portion of the present embodiment showing the manifold support in housed unlatched position.
Figure 5 is a longitudinal centrally offset sectional view with the manifold shown in housed latched position.
Figure 6 is a detail sectional view similar to Figure 5 partially broken away showing, however, the manifold support in extended position.
Figure 7 is a detail plan view partially broken away and partially in section with the manifold support in extended position.

Just rearwardly of the front edge of the support plate 26 and depending from the underface thereof are a pair of laterally spaced latch detents 34 having vertical leading faces 36 and upwardly rearwardly inclined trailing faces 38. When in retracted or housed position the detent leading faces 36 abut the upper rear face of the ledge 24, see Figures 3 and 5.

The unlatching mechanism includes a crank member 40 located in the forward portion of the housing 10 and having a pair of laterally extending shafts 42 and 44 respectively, the end of the shaft 42 engaging a circular recess in a housing side wall 14 and the shaft 44 passing through a corresponding circular opening on the opposite side wall 14 thereby to permit the rocking of the crank member 40. A manipulating finger 46 is rigidly secured to the free end of the shaft 44 external to the housing 10 closely adjacent side wall 14. Projecting forwardly and supported by and between the shafts 42 and 44 and formed integrally therewith is a lifting element 48 which is rotatably movable upon rocking the crank 40 between a lower position resting in a recess 50 formed in the upper face of ledge 24 and a raised position to engage the underface of the support plate 26 and elevate the forward portion thereof above the level of ledge 24 sufficiently to effect disengagement between the detent 34 and the ledge 24. Also mounted in and between the shafts 42 and 44 below said shafts and parallel and eccentric thereto is a rod 52. It should be noted that the crank 40 consisting of the shafts 42 and 44 and the lifting element 48 may be formed of an integral rod, and that rod 52 may be formed of the same stock. It should be further noted, that when the lifting element 48 is nested in the recess 50 the shafts 42 and 44 are above the level of the lifting element 58 as well as above the level of the top surface of the ledge 24 thus supporting and providing a suitable bearing surface for the sliding of the support plate 26 between extended and retracted positions. Moreover, the spacing between the detents is greater than the width of the lifting element 48 so that the latter does not interfere with the movement of the support plate 26.

A long helical tension spring 54 has one end secured to the housing bottom wall 12 by means of a rivet 56, reaches forwardly around rod 52, extends rearwardly and has its other end secured to the rear undersurface of the support plate 26 by means of a rivet 58. As noted previously the spring 54 serves a dual purpose. It urges the support plate 26 to its fully extended position and is preferably under some stress when the plate 26 is so extended. Furthermore, it urges the shafts 42 and 44 to rotate counterclockwise as viewed in Figure 3 of the drawing normally to rest the lifting element 48 in the recess 50.

The support plate 26 may carry any desired arrangement of directories, pads and related devices. In the illustrated embodiment, a folder 60 having front and rear hinged covers 62 and 64 respectively, is secured to the upper face of the support plate 26 by cementing the outer face of the rear cover 64 to the upper face of the support plate 26 or in any other suitable manner. The inner face of the base cover 64 is provided with a pocket 68 which releaseably engages the backing member 70 of a memorandum pad 72. To the inner face of the front cover 62 is affixed a conventional directory 72' which may assume any desired shape.

Considering now the operation of the improved combination manifold housing and telephone platform, in normal inoperative position the folder 60 is closed and the support plate fully retracted within the housing 10 thus completely housing the folder 60 and the material carried thereby. When the support plate 26 is in its retracted rest position the lift element 48 is nested in the recess 50, the forward portion of the plate 26 rests on the shafts 42 and 44 and the front faces 36 of the detents 34 abut the rear face of the ledge 24. By momentarily depressing the free end of the finger piece 46 to rock the shafts 42 and 46 clockwise against the opposite urging of the helical spring 54 the lift member 48 bearing against the under face of the support plate 26 is rotated out of recess 50 and raises plate 26 so that the detents 34 are disengaged from and elevated above the level of the ledge 24. The tensioned spring 54 thereupon contracts to advance the support plate 26 to its external position, the back of the plate 26 resting on the skids 28 which slide along the bottom wall 12 and into the recesses 32 and the plate riding along the lifting member cross piece and the shafts 42 and 44. Since the plate 26 is forward heavy when fully extended it will fall to an inclined position until the upper face of the legs 30 engage the recess surfaces 33, as previously set forth. The folder 60 may then be opened and use made of its contents. In housing the folder 60 it is merely closed and the support plate is pushed into the housing 10 through the opening 22 and the detents 34 fall into engagement with the rear wall of the ledge 24. The retracting of the support plate 26 reloads the spring 54 for the subsequent automatic extension of the support plate 26. As seen in Figure 1 of the drawing a telephone T can be conveniently located on the upper surface of the top wall 16 which defines a telephone platform.

While there has been described and illustrated herein a preferred embodiment of the present invention it is apparent that numerous alterations and omissions may be made without departing from the spirit thereof. Having now described our invention, what we claim and desire to secure by Letters Patent is:

1. A device of the character described comprising a substantially flat housing of rectangular configuration and having a bottom wall, side walls and a top wall defining a telephone receiving and locating platform and having a front opening formed therein, an upwardly directed ledge disposed on the forward border of said bottom wall along said opening, a plate movable through said front opening between an advanced position and a retracted position relative to said housing, a pair of laterally spaced skids depending from the rear portion of said plate and having forwardly directed bottom legs abutting said bottom wall, a pair of recesses formed in the rear of said ledge in longitudinal alignment with said skid legs and having rearwardly upwardly inclined upper surfaces, a crank member having transversely extending shafts and located in the vicinity of said ledge and having laterally extending shafts rotatably engaged by said housing side walls, one of said shafts projecting through said side wall and terminating in a finger piece, said crank having an eccentric portion adapted to raise the forward portion of said plate upon rotation of said shaft, a detent depending from the forward portion of said plate and adapted to engage the rear surface of said ledge when said plate is in retracted position, a rod supported by and between said shafts, below and parallel to said shafts, and a helical tension spring having one end secured to the rear portion of said housing, passing around said rod and having its other end secured to the rear portion of said plate.

2. A device in accordance with claim 1 wherein said ledge has a recess formed in the upper face thereof adapted to receive the eccentric portion of said crank member when said crank member is in a depressed position.

3. A device of the character described comprising a substantially flat housing of rectangular configuration and having a bottom wall, side walls and a top wall defining a telephone receiving and locating platform and having a front opening formed therein, an upwardly directed ledge disposed on the forward border of said bottom wall along said opening, a plate movable through said front opening between an advanced position and a retracted position relative to said housing, a crank member having transversely extending shafts and located in the vicinity of said ledge and having laterally extending shafts rotatably engaged by said housing, one of said shafts projecting through said side wall and terminating in a finger piece, said crank having an eccentric portion adapted to raise the forward portion of said plate upon rotation of said shaft, a detent depending from the forward portion of said plate and adapted to engage the rear surface of said ledge when said plate is in retracted position, a rod supported by and between said shafts and eccentric thereto, and a helical tension spring having one end secured to the rear portion of said housing, passing around said rod and having its other end secured to the rear portion of said plate.

References Cited in the file of this patent

UNITED STATES PATENTS

| | | |
|---|---|---|
| 1,434,265 | Rosine et al. | Oct. 31, 1922 |
| 1,518,876 | Rosine | Dec. 9, 1924 |
| 2,522,361 | Hill | Sept. 12, 1950 |
| 2,582,562 | Rice | Jan. 15, 1952 |
| 2,593,475 | Neilson | Apr. 22, 1952 |